United States Patent [19]
Powell

[11] 4,072,320
[45] Feb. 7, 1978

[54] COUPLING ELEMENT FOR TRAILER HITCHES

[76] Inventor: Leon A. Powell, 2144 W. Broadway No. 67, Phoenix, Ariz. 85041

[21] Appl. No.: 712,094

[22] Filed: Aug. 5, 1976

[51] Int. Cl.² .............................................. B60D 1/14
[52] U.S. Cl. .................................. 280/415 A; 280/504; 403/122; 403/353
[58] Field of Search .................. 280/504, 511, 415 R, 280/415 A; 403/353, 76, 122, 123, 141

[56] References Cited
U.S. PATENT DOCUMENTS

| | | | |
|---|---|---|---|
| 2,458,209 | 1/1949 | Sawatzki | 280/511 |
| 3,332,163 | 7/1967 | Stewart et al. | 403/353 X |
| 4,004,822 | 1/1977 | Fisk | 280/504 X |

*Primary Examiner*—Joseph F. Peters, Jr.
*Assistant Examiner*—Michael J. Forman
*Attorney, Agent, or Firm*—Cahill, Sutton & Thomas

[57] ABSTRACT

A device securably mountable on a ball of the type used to couple with a socket for hitching a trailer to a towing vehicle to provide a coupling element for receiving a coupling member in the form of a terminal eye member attached to the trailer tongue.

4 Claims, 2 Drawing Figures

COUPLING ELEMENT FOR TRAILER HITCHES

This invention relates to coupling assemblies, and more particularly to a coupling member adapted for use in hitching trailers to a towing vehicle.

Ball and socket coupling assemblies are the most widely used design for coupling a trailer to the towing vehicle. The ball is securely mounted on the rear bumper of the towing vehicle. The socket is attached to the trailer, generally as the terminal member of a tongue extending from the trailer. There are certain types of trailer equipment which do not utilize a ball and socket coupling assembly. This type of equipment is found particularly in the construction industry. Portable electrical generators and compressors are typical examples. This type of equipment utilizes an eye or ring commonly termed a lunar hitch which couples to a hook member mounted on the bumper or draw bar of the towing vehicle. If the bumper or drawbar is already equipped with a ball, the ball must be removed whenever this special equipment is to be trailed. Removal of the ball is often difficult and always an inconvenience. After removing the ball, it is necessary to mount a hook or other suitable coupling element in place of the ball, to receive the eye or ring. The entire operation is time consuming and because of the repeated change over of equipment there is an increased likelihood of damage to the coupling elements or of a mistake in attaching the ball or hook to the bumper.

it is an object of this invention to provide a coupling element for receiving an eye or ring member, to provide a trailer coupling assembly.

A further object is the provision of such a coupling element which can be adapted to a ball used in conventional trailer coupling assemblies.

These and other objects are accomplished in the present invention by a device couplable to a ball member having a spherical head and a neck of reduced dimension, which device includes an elongated cylindrical member having a longitudinally extending chamber, an axially aligned first orifice and a second orifice in the wall of the cylindrical member, the first orifice and the second orifice being in communication with each other. The second orifice is dimensioned to a admit the head of the ball into the chamber, whereas the first orifice is dimensioned to accomodate the neck of the ball member but not the head. The device further includes means for securing the ball head within the chamber of the cylindrical member as well as means for securing the eye of the lunar hitch to the cylindrical member.

The invention is further described with respect to a preferred embodiment depicted in the accompanying drawings, wherein.

Figure 1:
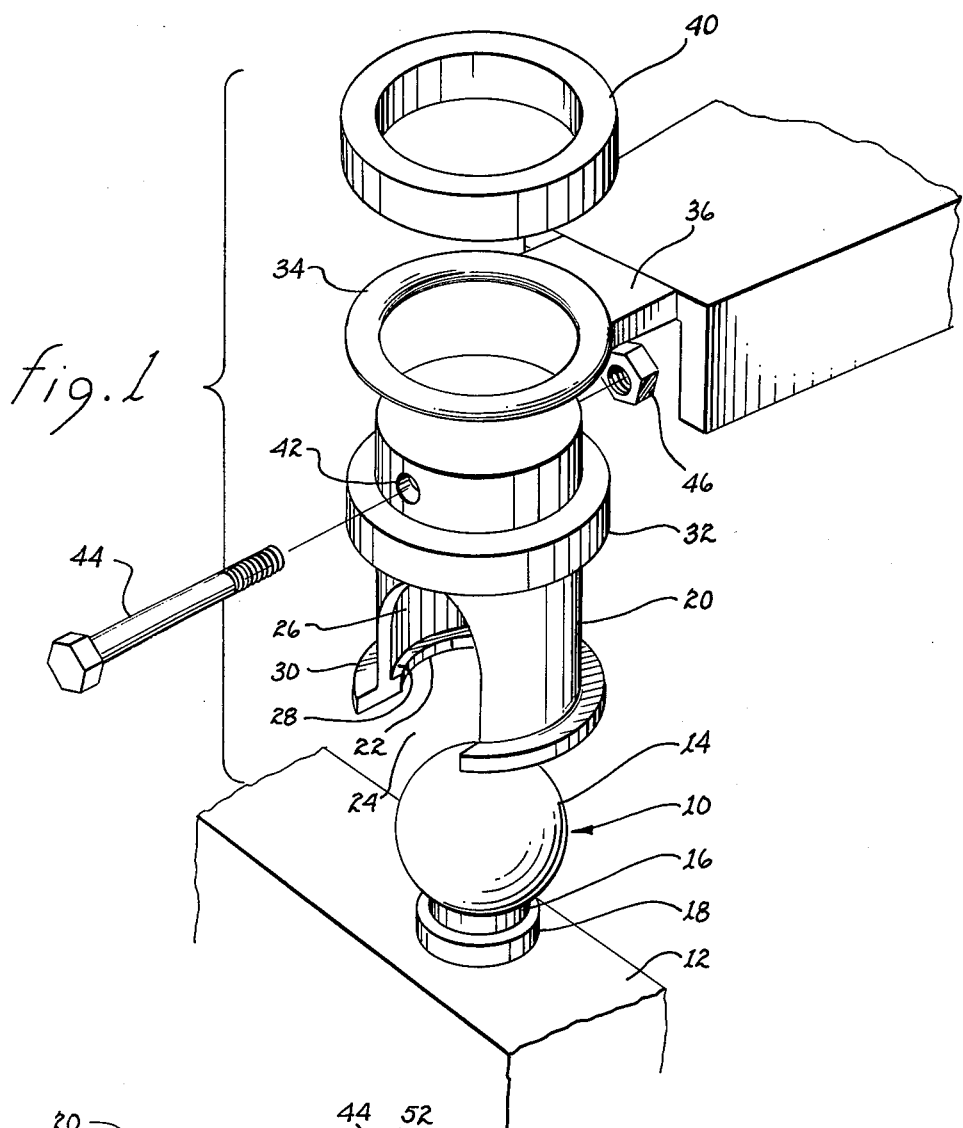
FIG. 1 is a perspective view of the coupling device of the invention with parts shown in exploded relationship.

Referring to FIG. 1, a ball 10 is mounted on a bumper 12. Ball 10 includes a spherical head 14, neck 16 of reduced cross-section, and a base 18. Poised above ball 10 is a cylindrically-shaped member 20 having a longitudinally extending chamber 22. Member 20 has a circular-shaped base orifice 24 and an arcuate shaped orifice 26 in the wall of member 20. Orifice 26 extends from the base of member 20 upwardly a distance slightly greater than the height of ball 10. Extending radially inwardly from cylindrical member 20 and partially surrounding orifice 24 is a lip 28 which serves to reduce the crosswise dimension of orifice 24 to a diameter less than the diameter of the head 14 of ball 10. Extending radially outwardly from cylindrical member 20 is a semi-circular flange 30 which serves as a base for cylindrical member 20. The gap between the proximate ends of flange 30 defines the width of orifice 26. Orifice 26 is dimensioned to laterally receive the head 14 of ball 10. A first retaining ring 32 is fitted over cylindrical member 20. Above cylindrical member 20 is poised an eye or hitch ring 34 which extends from a tongue 36 which extends from the equipment to be trailed. Above eye 34 is shown a second retaining ring 40. Cylindrical member 20 has opposing apertures 42 which receive a threaded bolt 44 which is secured by a nut 46.

Figure 2:
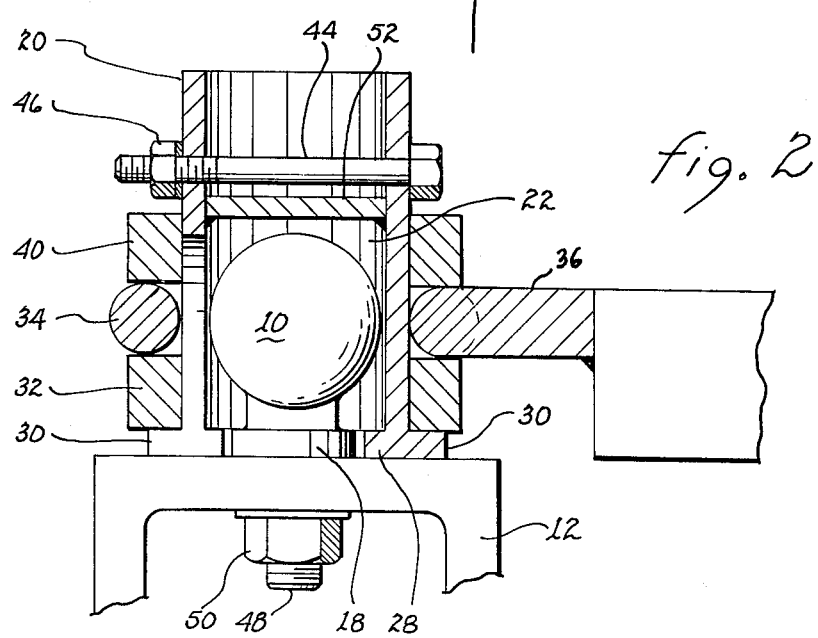
FIG. 2 is a cross-sectional view in elevation of the coupling device of the invention.

FIG. 2 illustrates the positioning of the various elements depicted in FIG. 1. Ball 10 is mounted on bumper 12 by means of a bolt 48 extending through bumper 12 and secured in place by nut 50. head 14 and of ball 10 is located within chamber 22. Resting on flange 30 is first retaining ring 32. Sandwiched between ring 32 and ring 40 is eye 34. Spanning the interior walls of cylindrical member 20 is a plug 52 which defines the height of chamber 22. Plug 52 is optional and may be eliminated if desired.

The device of the present invention may be regarded as an adapter for a conventional ball of a coupling assembly for hitching a trailer to the towing vehicle. The adapter is installed by moving the cylindrical member 20 laterally into position around the ball 10 by passing the head 14 through orifice 26. Orifice 24 is of restricted dimension so that member 20 can not be lowered onto ball 10 nor can member 20 be vertically lifted off ball 10. This prevents member 10 from popping off ball 10 during trailing of the towed equipment. After positioning ball 10 in chamber 22, first retaining ring 32 is lowered into place and then eye 34 is dropped down onto cylindrical member 20 where it comes to rest atop first retaining ring 32. Second retaining ring 40 is then located over eye 34, and bolt 44 is passed through apertures 42 and secured by bolt 44.

Installation can be accomplished easily and quickly, and by use of the adapter, removal of ball 10 is avoided. The coupling assembly provides a strong coupling and by suitably dimensioning orifices 24 and 26 can accomodate more than one size ball.

What is claimed is:

1. A device for coupling a hitch ring of a trailer tongue to a ball-type trailer hitch having a ball member and a neck of reduced cross-sectional dimension connecting said ball member to a towing vehicle, said device comprising:
    a. an elongated tubular member penetratingly insertable within the hitch ring for engaging the ball member of the hitch and for transmitting horizontally oriented forces from the hitch ring to the ball member, said tubular member having an inner chamber for receiving the ball member;
    b. a partially cutaway annular flange positioned on one end of said tubular member for receiving and partially circumscribing the neck, the cutaway portion of said flange forming a first orifice dimensioned to accomodate the nect but not the ball member, said flange having an outer diameter greater than the outer diameter of said tubular member and an inner diameter less than the diameter of the ball member;

c. a second orifice located in the wall of said tubular member coincident with opposed edges of said first orifice and communicating with said chamber, said second orifice being dimensioned to permit removal of the ball member from said chamber therethrough by relative lateral displacement between said tubular member and the hitch;

d. first retaining means slidably locatable along the longitudinal axis of said tubular member and positionable around said tubular member adjacent said flange for closing off said second orifice and precluding lateral displacement of the ball member from within said chamber; and e. second retaining means removably locatable along the longitudinal axis of said tubular member for retaining the hitch ring adjacent said first retaining means and in a fixed relationship with respect to the longitudinal axis of said tubular member.

2. The device according to claim 1 wherein said first retaining means includes a first ring member.

3. The device according to claim 2 wherein said second retaining means includes a second ring member.

4. The device according to claim 3 wherein the other end of said tubular member includes a pair of opposing apertures and wherein said second retaining means includes a shaft passing through said pair of opposing apertures for retaining said second ring member in a fixed relationship with respect to said tubular member.

* * * * *